United States Patent [19]
Duan

[11] Patent Number: 5,993,668
[45] Date of Patent: Nov. 30, 1999

[54] METHOD FOR REMOVING METAL IONS AND/OR COMPLEXES CONTAINING METAL IONS FROM A SOLUTION

[75] Inventor: Hailing Duan, Allendale, N.J.

[73] Assignee: Fuji Hunt Photographic Chemicals, Inc., Allendale, N.J.

[21] Appl. No.: 08/919,258

[22] Filed: Aug. 28, 1997

Related U.S. Application Data

[62] Division of application No. 08/632,542, Apr. 19, 1996, Pat. No. 5,728,295.

[51] Int. Cl.⁶ ........................................................ C02F 1/62
[52] U.S. Cl. .............................. 210/713; 75/713; 75/723; 75/733; 210/638; 210/641; 210/651; 210/712; 210/715; 210/727; 210/732; 210/735; 210/738; 210/790; 210/912; 423/34
[58] Field of Search ............................ 75/713, 722, 723, 75/733; 210/638, 639, 641, 651, 710, 712, 713, 715, 725, 727, 728, 732, 735, 738, 912, 790; 423/34

[56] References Cited

U.S. PATENT DOCUMENTS

| | | |
|---|---|---|
| 2,074,082 | 3/1937 | Domogalla . |
| 3,933,642 | 1/1976 | Wilson . |
| 4,297,221 | 10/1981 | Moll et al. . |
| 4,357,242 | 11/1982 | Chandler . |
| 4,388,195 | 6/1983 | Von Hagel et al. . |
| 4,470,907 | 9/1984 | Sencza . |
| 4,517,091 | 5/1985 | Yamanaka et al. . |
| 4,566,975 | 1/1986 | Allgulin . |
| 4,670,160 | 6/1987 | Moriya et al. . |
| 4,670,180 | 6/1987 | Moriya et al. . |
| 4,724,084 | 2/1988 | Pahmeier et al. . |
| 4,731,187 | 3/1988 | Moriya et al. . |
| 5,082,560 | 1/1992 | Eli et al. . |
| 5,288,728 | 2/1994 | Spears et al. . |
| 5,403,490 | 4/1995 | Desai . |
| 5,423,990 | 6/1995 | Michiels et al. . |
| 5,437,792 | 8/1995 | Syembrot et al. . |
| 5,549,820 | 8/1996 | Bober et al. . |
| 5,605,633 | 2/1997 | Nakamura et al. . |
| 5,728,295 | 3/1998 | Duan ..................................... 210/195.1 |

FOREIGN PATENT DOCUMENTS

| | | |
|---|---|---|
| 578852 | 1/1994 | European Pat. Off. . |
| 596549 | 5/1994 | European Pat. Off. . |
| 2571354 | 10/1984 | France . |
| 5320928 | 5/1993 | Japan . |
| 6-65744 | 6/1994 | Japan . |

*Primary Examiner*—Peter A. Hruskoci
*Attorney, Agent, or Firm*—Sughrue, Mion, Zinn, Macpeak & Seas, PLLC

[57] ABSTRACT

Metal ions and/or complexes of metal ions are removed from a solution by formation of an insoluble chelated complex of the metal ions and a polymeric precipitating agent. A two-step process of mixing the influent with the precipitating agent is used to induce rapid precipitation and obtain large, self-agglomerated precipitate without addition of flocculating agent and/or pH adjustment. In addition, parallel loops are employed to simultaneously discharge treated metal-free solution and effectively collect/remove the precipitate-containing sludge without interfering with each other. The metal capturing capacity of the polymeric precipitant is maximized by forcing the influent solution through layers of the collected precipitate and by recycling unsaturated metal-precipitant complexes in the processing loop.

13 Claims, 8 Drawing Sheets

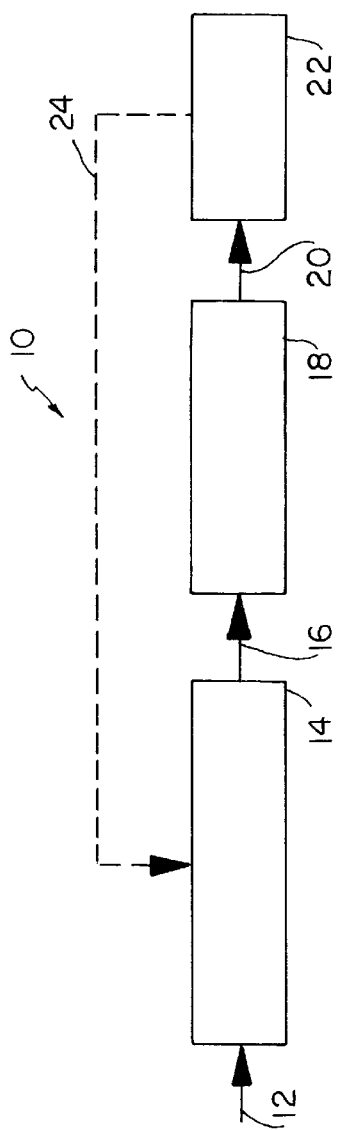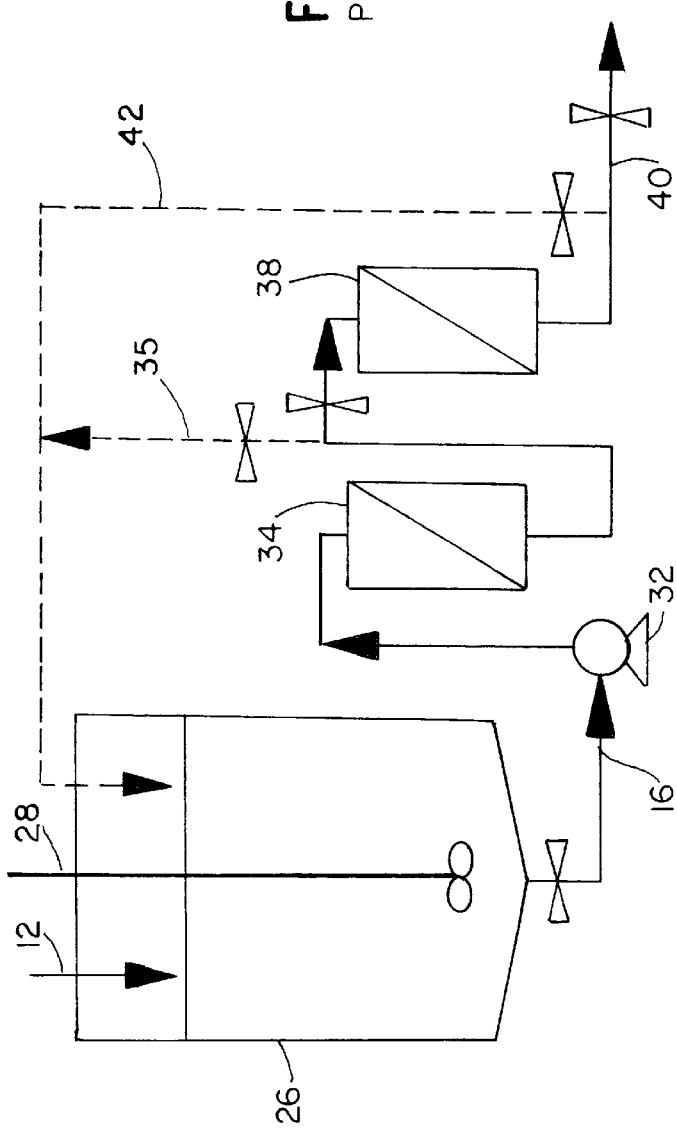

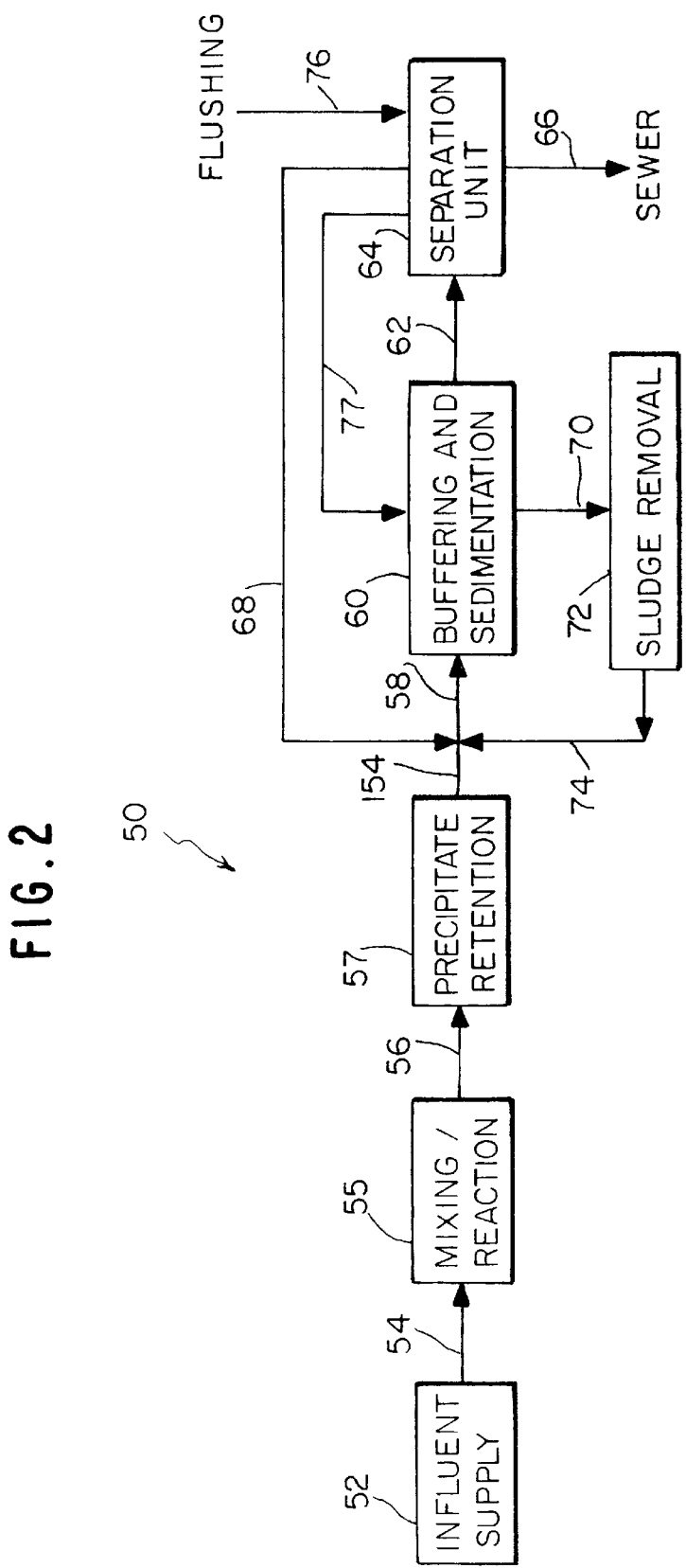

METHOD FOR REMOVING METAL IONS AND/OR COMPLEXES CONTAINING METAL IONS FROM A SOLUTION

This is a divisional of application Ser. No. 08/632,542 filed Apr. 19, 1996 now U.S. Pat. No. 5,728,295.

BACKGROUND OF THE INVENTION

1. Field of the Invention

The present invention relates to the removal of metal ions and/or their complexes from a solution.

2. Description of the Related Art

Metal ions and/or their complexes, hereinafter collectively referred to as "metal ions", can be removed from waste water streams by using precipitating agents which form insoluble compounds. See, for example, published Japanese Patent Application Nos. 07-148492 and 07-248582, European Patent Application Publication No. 0670289 A1, and "Silver Recovery from Photographic Waste Processing Solutions By Using the Trisodium Salt of 2,4,6-Trimercapto-5-Triazine," by Spears et al., presented at the Seventh International Symposium on Photofinishing Technology in San Francisco, Calif., Feb. 3–5, 1992, the disclosures of which are herein incorporated by reference.

Conventional precipitation technology uses sequential processing. Referring to FIGS. 1a and 1b, for example, it is shown in block diagram and schematic format, respectively, a conventional processing system 10 for removing metal ions from waste water. System 10 includes an influent line 12 for providing waste water to a mixing unit 14 for mixing and reacting the precipitating agent with the metal ions contained in the waste water and also for conducting sedimentation of the precipitate.

Treated solution flows through line 16 by the pumping action of pump 32 to a sludge collection unit 18, which may include a coarse filter for removing relatively large particles and a fine filter for removing relatively small particles from the solution; the coarse and fine filters are sequentially arranged. Filtrate from sludge collection unit 18 flows through line 20 to discharge unit 22, and a portion of the filtrate may optionally be returned through recycle line 24 to the mixing unit 14 to further react or coat dead-end type filters to increase system efficiency.

This system is shown in more detail in FIG. 1b. In particular, mixing unit 14 typically comprises a tank 26 including a stirrer 28. Treated solution flows out from the system through discharge line 40. Optional recycle lines 42 and 35 may be used to coat the filtration media 34 and 38 respectively in the initial stages.

The above-described sequential system, however, is disadvantageous. The most significant disadvantage is the sludge run-through problem. In order to achieve reasonable processing capacity, the system throughput must be maintained at a certain level. However, at this level, the flux of the solution passing through the filter tends to be so large that it may breakdown the precipitate, causing sludge to run through the filters to the discharge. This is especially true for soft polymeric precipitates.

While it may be possible to solve this problem by increasing the effective area of the filtration medium to reduce the actual flux while keeping the same level of total throughput, it will be appreciated that this solution is neither desired from an economic standpoint, nor from the standpoint of maintaining a consistently reliable and very low silver discharge level.

Additionally, the above-described sequential technique for removing metal ions from a waste water stream is typically conducted as a batch process which involves both time consuming charging and discharging steps plus a sedimentation step. Still further, this system is disadvantageous economically when scaling up, since the capacity and size of the equipment will be proportional to the treatment capacity desired.

SUMMARY OF THE INVENTION

Accordingly, it is an object of the present invention to provide a continuous process for efficiently and economically removing metal ions from a waste water stream.

Another object of the invention is to improve the mixing of the metal ions and the precipitating agent when removing the metal ions from a waste water stream so as to induce rapid precipitation and agglomeration of the metal ions without the need for either the separate addition of an agglomerating/flocculating agent or a prolonged sedimentation period.

Another object of the invention is to efficiently remove and collect the precipitate created when the metal ions have been precipitated from the photographic processing waste water without detracting from the overall operation of the system.

Another object of the invention is to implement the treatment of a waste water stream containing a wide concentration range of metal ions (e.g., typically 1 to 1000 mg/l) such that the metal ions in the treated effluent is consistently maintained at an extremely low level, e.g. typically less than 0.1 mg/l, and thereby meets stringent environmental discharge regulations.

These objects and additional objects of the invention are achieved by a method in accordance with the present invention whereby a solution containing metal ions is mixed with an amount of a precipitating agent effective to form a chelated metal-precipitant complex containing the metal ions and the precipitating agent. The chelated metal-precipitant complex is then mixed with an additional amount of the metal ions effective to induce rapid precipitation of the chelated metal and the precipitating agent. Preferably, the chelated metal-precipitant complex is mixed with an additional amount of the solution containing the metal ions by dividing an influent stream of the solution into a first solution stream for mixing with the precipitating agent to form the chelated metal-precipitant complex, and a second solution stream for mixing with the chelated metal-precipitant complex to rapidly precipitate the chelated complex of the metal ions and the precipitating agent. The precipitating agent and the solution may be allowed to remain in contact for a first predetermined interval of, for example, 10 seconds to 5 minutes (i.e., first coil dwell time) after the solution and the precipitating agent are first mixed. Subsequently the chelated metal-precipitant complex is allowed to mix with an additional amount of metal ions for a second predetermined interval of, for example, 1 to 5 minutes (second coil dwell time). This results in rapid precipitation of the chelated metal-precipitant complex.

Preferably, 1 to 10 equivalents of precipitating agent per equivalent of total metal ions contained in the solution is added to form the chelated metal-precipitant complex. The precipitating agent preferably comprises a water soluble, polyelectrolyte compound. In accordance with a preferred embodiment of the invention, the solution may be waste water from photographic emulsion processing, the waste water containing metal ions, particularly, silver ions.

An apparatus is also provided for precipitating metal ions from a solution in accordance with the foregoing method. The apparatus includes a first mixer for mixing an influent stream of the solution with an amount of the precipitating agent effective to form the chelated metal-precipitant complex, and a second mixer for mixing the chelated metal-precipitant complex with an additional amount of the metal ions effective to induce rapid precipitation of the complex. Preferably, the apparatus includes a device for dividing the influent stream in the manner discussed above and a further device for contacting the solution and the precipitating agent, also in the manner discussed above.

Additionally, a process is provided for removing metal ions from a solution whereby a precipitate comprising the chelated complex of the metal ions and the precipitating agent is removed by a combined process of filtration, and settling the precipitate in a tank, withdrawing a first solution stream from the tank which contains the precipitate, removing the precipitate from the first solution stream and adding the first solution stream to the tank influent solution stream. In this same process, a second solution stream is withdrawn from the tank, which contains an unsettled chelated complex of metal ions and the precipitating agent. This unsettled complex is concentrated from the second solution stream and added to the tank influent solution stream, while substantially metal-free effluent is discharged. Preferably, the second solution stream is subjected to open-end filtration, more preferably cross-flow filtration, to concentrate the unsettled complex, and the first solution stream is filtered using a bag filter or other suitable dead-end filter to collect the precipitate.

An apparatus is also provided for carrying out this process, which includes in-line mixers for mixing and reacting influent streams with the precipitating agent to form the precipitate, a coarse filtration device to retain a significant portion of the precipitate, a tank to receive the filtrate from the coarse filtration device and to divide it into two independent streams, the first solution stream with higher level of the precipitate and the second solution stream with lower level of the precipitate, and two separation devices connected to the tank, the first separation device for collecting the precipitate in the first stream and the second separation device for discharging metal-free solution from the second stream. The solution withdrawn through the second outlet is treated in a separation device to discharge substantially metal-free effluent. This separation device separates the unsettled complex of the metal ions and any precipitating agent present which are returned to the influent solution stream.

The term "metal ions" as used herein, means free metal ions, e.g., silver ions, present in the waste water as well as complexes of the free metal ions, e.g., silver thiosulfate $(Ag(S_2O_3)_2^{-3}$. Additionally, the term "chelated metal-precipitant complex" as used herein, means a complex of the precipitating agent and the metal ions formed by chelation.

BRIEF DESCRIPTION OF THE DRAWINGS

Other features and advantages of the present invention will become apparent when the following description is read in conjunction with the accompanying drawings, in which:

FIGS. 1a and 1b show in flow chart and schematic diagram respectively, a conventional sequential system for removing metal ions from a waste water stream using a precipitation method FIG. 2 shows a block diagram of a parallel system for removing chelated metal-precipitant complex from a waste water stream in accordance with the present invention;

DETAILED DESCRIPTION OF THE PREFERRED EMBODIMENTS

Figure 3:
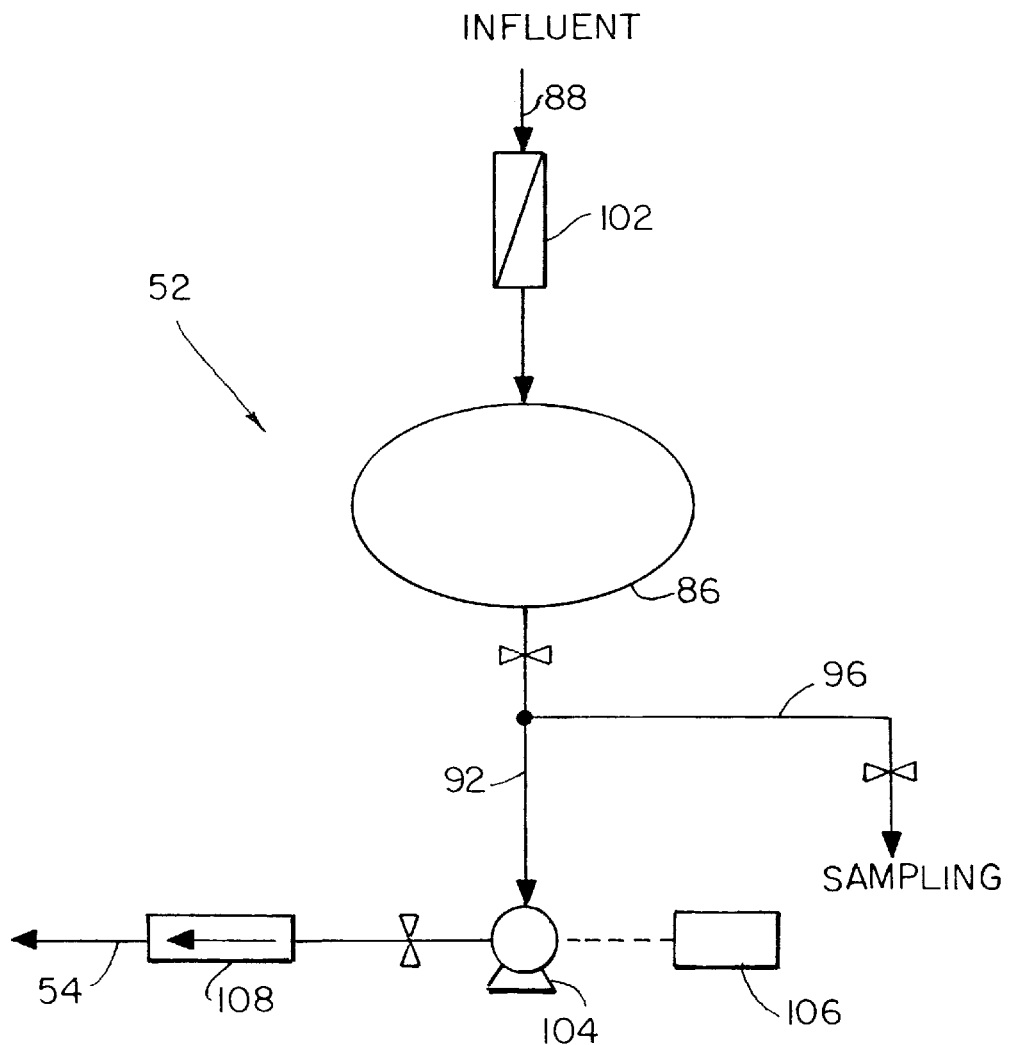
FIG. 3 shows a schematic diagram a portion of the system in accordance with the present invention illustrated in FIG. 2 pertaining to the influent supply unit.

Referring now to the drawings wherein like numbers indicate like elements, FIG. 2 shows a system for removing chelated metal-precipitant complex from waste water in accordance with the principles of the invention and designated generally as 50. System 50 includes an influent supply unit 52 connected via line 54 to a mixing unit 55 for mixing influent and precipitating agent, and then to a primary precipitate retention unit 57 through line 56, which in turn is connected via lines 154 and 58 to a buffering and sedimentation unit 60. The solution flows from buffering and sedimentation unit 60 through line 62 to a separation unit 64, and treated solution is removed from system 50 at discharge line 66. A portion of the effluent from separation unit 64 flows through line 68 back to the tank solution feeding line 58. Flushing water flows through line 76 to the separation unit 64, and discharges to buffering unit 60 through line 77. Line 70 from buffering and sedimentation unit 60 is provided for removing a solution containing the precipitate in unit 60. This solution flows through line 70 to a sludge removal unit 72 for sludge collection, and the filtrate is sent back to the tank solution feeding line 58 through line 74. Thus, the precipitate removal loop through line 70, sludge removal unit 72 and line 74 operates in an independent, simultaneous parallel manner with the discharge loop passing through separation unit 64. It will be understood that throughout the figures there may be valves which are not discussed because their operation will be readily apparent to one skilled in the art.

Influent supply unit 52, shown in more detail in FIG. 3, may contain any suitable tank system for receiving incoming waste water and storing the same, if needed. However, it does not form an essential part of the present invention. It will be understood that solution may come to influent supply unit 52 directly from, for example, a photographic processor and be diluted, if desired, or can first be treated in an electrolytic processor to remove up to 90 to 98% by weight of the targeted metal ions.

A suitable unit for use in the present invention includes a reservoir system as shown in FIG. 3. The influent is fed into the reserve tank 86 through line 88 and a coarse filter 102 for an initial filtration of suspended solids contained in the influent solution, such as dust, paper particles, gelatin particles, etc. The reserved solution is fed into the processing system by a pump 104, through line 92, a flow-meter 108, and line 54. The feeding rate may be controlled by a pumping-rate control device 106. A sampling line 96 may be provided for sampling the influent solution.

Figure 4:
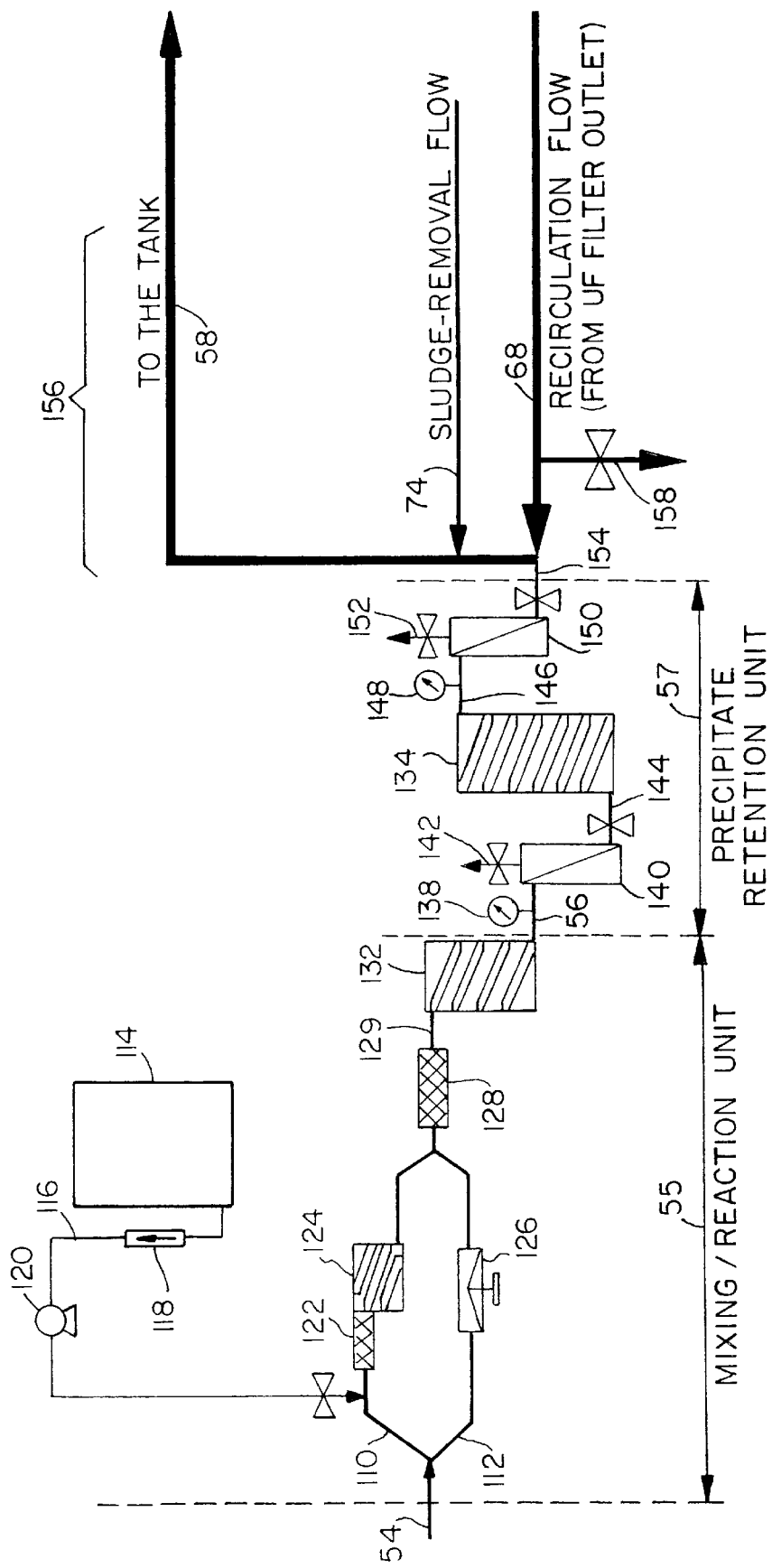
FIG. 4 shows schematically and in more detail a portion of the system in accordance with the present invention illustrated in FIG. 2 pertaining to an influent and precipitating agent mixing and precipitation retention unit.

Mixing unit 55 and precipitate retention unit 57 are shown in more detail in FIG. 4. The feeding influent solution from the influent supply unit 52 through line 54 is divided into two separate streams in a predetermined ratio, approximately in the range of between 1–3:1 volumetric ratio between lines 110 and 112, respectively. However, as one skilled in the art would appreciate, depending upon the metal ion concentration in the influent solution and the dosage of the precipitating agent, etc., the volumetric ratio of the split of the influent stream between lines 110 and 112 may vary and may be 4:1 respectively, or higher. Precipitating agent contained in precipitating agent reservoir 114 is dosed through line 116 under the control of the pumping action of a precision metering pump 120 and can be monitored by a flowmeter 118. The precipitating agent is mixed with the influent solution from line 110 in a relatively small static mixture 122, and the chelating reaction is allowed to complete in for example, a tubing timing coil 124 and then are combined in mixer 128 with influent solution flowing through line 112 under the control of a flow control device 126. Preferably the residence time in the coil 124 is about 10 seconds to about 5 minutes, more preferably, 20 seconds to 1 minute, depending on the metal complex ion concentration in the influent and the dosage of the precipitating agent.

As will be discussed in detail below, it has been discovered that such an arrangement for mixing the influent solution with precipitating agent is particularly advantageous in that a chelated metal-precipitant complex containing the targeted metal ion and the precipitating agent may be formed in the tubing timing coil 124. Without the addition of a separate agglomeration/flocculation agent, rapid precipitation of the metal-precipitant complex may be induced in the tubing timing coil 132 when it is combined in the main mixer 128 with the additional metal ion contained in the second stream of influent solution flowing through line 112.

The precipitate retention unit 57 serves for two purposes: (1) reduce the load of the final separation unit 64 by retaining the major portion of the sludge formed in mixing reaction unit 55 before it goes to the buffering and sedimentation tank 60, so that the solid content level in the tank is kept at minimum; (2) maximize the metal capturing capacity of the polymer precipitating agent by forcing the mixture flow (which may contain unchelated free metal ions) through the retained precipitate layer coated on the surface of the filtration media which may still contain unchelated residual functional groups. In more detail the mixture from line 129 is allow to further react and precipitate in the tubing coil 132, and the precipitate formed in 132, may be retained in any suitable dead-end filtration device 140. Optionally, another set of tubing timing coil 134 and filtration device 150 may be supplied following filter 140. The solution and suspended precipitate passing through filter 140 will further react and grow in the tubing coil 134 and may be collected by another suitable dead-end type filter 150 with finer pore size than the first one 140. The degree of saturation of the two filtration devices may be monitored by pressure gauges, or switches 138 and 148 respectively. Optionally two sampling outlets 142 and 152 may be used to take samples of the filtrate after each filter. Preferably, the residence time in coil 132 is about 1 to 10 minutes, more preferably, 1 to 2 minutes, and the residence time in coil 134 is 1 to 10 minutes, more preferably, 2 to 5 minutes.

Filtrate from filter 150 flows through line 154 to a transport system 156 for transporting the filtrate to the buffering and sedimentation unit 60. Transport system 156 will be more readily understood upon reading the following description, however, in brief, transport system 156 includes line 154 for transporting the filtrate from filter 150 to the buffering and sedimentation tank 60, as well as line 74 carrying the filtrate from the sludge removing unit 72, and recirculation line 68 from the separation unit 64, which may include line 158 for sampling the solution contained in recirculation line 68.

Figure 5:
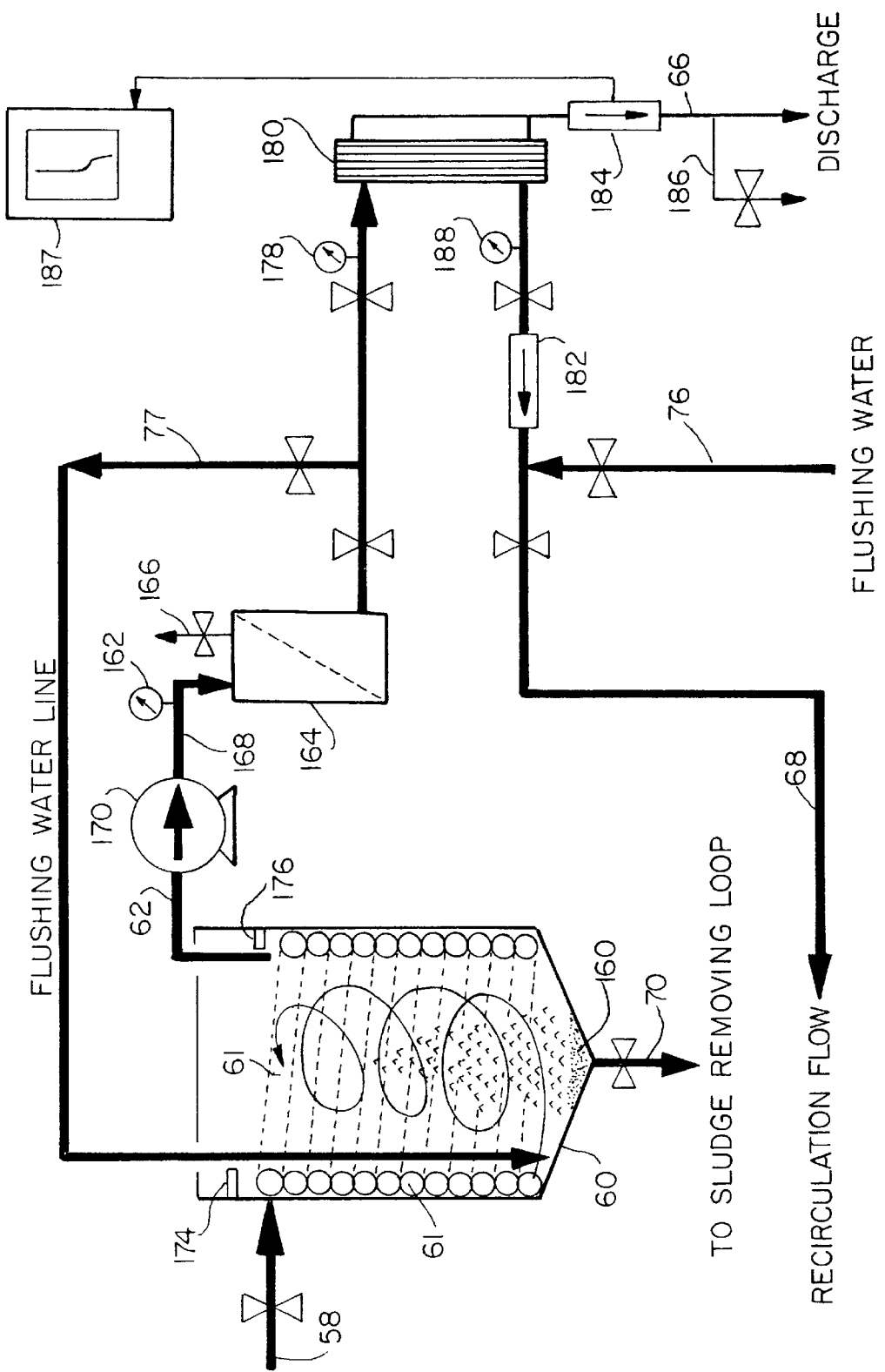
FIG. 5 shows a schematic diagram of a portion of the system in accordance with the present invention illustrated in FIG. 2 pertaining to the separation unit.

The details of the buffering and sedimentation unit 60 and the separation unit 64 are shown in FIG. 5. The components of this unit include the buffering and sedimentation tank 60, the fluid transferring pump 170 and the filtration device 180. The basic function of this unit is to further separate the precipitate from the filtrate feeding through line 154, and discharge metal-free solution to the drain. The function of the buffering and sedimentation tank is to branch the feeding mixture in line 58 into two streams: low solid content stream 62 and high solid content stream 70. The low solid content stream refers to a stream relatively depleted of suspended precipitate, whereas the high solid content stream refers to a stream relatively enriched in suspended precipitate. The former is sent to the filtration device 180 by the fluid transferring pump 170 to discharge metal-free solution, and the latter is sent to the sludge collection unit 72 for precipitate collection. These two loops are operating simultaneously and in parallel, so that the metal-free solution can be continuously discharged at a steady rate while the sludge is collected at the same time, without interfering with each other.

In more detail, the influent (in line 58) feeding to the buffering and sedimentation tank 60 contains suspended precipitate from filtrate streams in lines 154, 74, and 68. The tank preferably includes a tubing coil 61 spiral along the tank wall, which may provide additional reaction, aggregation and settling time for the feeding mixture. Optionally, the feeding mixture may be introduced into the buffering and sedimentation tank 60 in a tangential angle along the tank wall and at a lower portion thereof generally at or near the beginning of cone portion of tank 60. This is particularly advantageous in creating a vortex movement of the fluid along the direction of the arrow shown in FIG. 5 (in the tank). The fluid dynamics of this vortex movement concentrates the light-weight floating precipitate toward the vertical center-line of tank 60, and the combination of the gravity and vortex effects results in a tower-like concentration distribution of the precipitate; i.e., most of the high density particles tend to be concentrated in the lower-center cone bottom of tank 60, and thereby the solid content level in the top layer portion of the solution is reduced, especially along the outer edge of the tank 60. This segregation effect will make the removal of sludge 160 from tank 60 through line 70 more efficient, and also reduces the filtration load of the discharging filter 180 by withdrawing the solution from the top layer portion in tank 60 (solution with lower solid content) through line 62. Such a vortex type tank is generally described in U.S. Pat. Nos. 1,125,658, 1,951,647, 2,538,870, 2,726,765, 3,215,272, 3,396,844, 3,962,084, and 4,517,091, the disclosure of each of which is herein incorporated by reference. Flow-level switches 174 and 176 may be installed in tank 60 to prevent the solution level in tank 60 from becoming high (causing flooding) or too low (causing the fluid transferring pump 170 to run dry).

If desired, the solution in line 168 may flow through an optional prefilter 164, which is used to retain relatively large and solid particles in the solution to avoid plugging and/or scratching the filtration medium in device 180. Prefilter 164 may include a line 166 for venting and/or sampling purposes. The pressure gauge (or switch) 162 is used to monitor (or control) the load level of the prefilter 164.

The filtration device 180 may be any type of suitable fine filter, but preferably is an open-end type filter, which can be used only for discharging metal-free solution without retaining any precipitate. This is particularly advantageous in that the steady state discharge rate of the metal-free solution may be optimized at a higher level, while the precipitate may be effectively collected by other dead-end filters in a separate loop under much gentle conditions without affecting the discharge rate of the metal-free solution. Pressure gauges 178, 188 and flow-meter 182 are used to establish proper filtration conditions for the open-end filter device 180. The filtrate from filter 180 is recycled back to the feeding line 58 of the buffering and sedimentation tank 60, through line 68. This recycling of the filtrate flow is particularly advantageous, because the filtrate stream contains concentrated, metal-polymer complex, which may further absorb free metal ions in the feeding stream 154, and hence fully utilize the metal absorption capacity of the polymer precipitating agent.

Optionally, a suitable flow-meter 184 in conjunction with a chart recorder (or any electronic storage device) 187 may also be used in the discharge line 66 of filter 180, to monitor and record the discharge rate and/or volume in real-time. Line 186 may be provided for sampling the discharge solution flowing through line 66, to monitor the residual metal-ion level in the treated solution.

To achieve higher average discharge rate on filter 180, periodic reverse flushing of the filter medium with short pulses of water can be applied through line 76, filter 180 and line 77 (in the opposite direction of the filtration circulation flow) by opening and closing of appropriate valves. The small amount of flushing solution is injected back to the bottom of the buffering and sedimentation tank 60 through line 77. The optimum flushing conditions i.e., the flushing pulse magnitude, duration and frequency) can be obtained by mathematical optimization of the total daily throughput on the filter using simulated permeation decay curve of the filter medium (see FIG. 9). This is discussed in more detail below.

Figure 6:
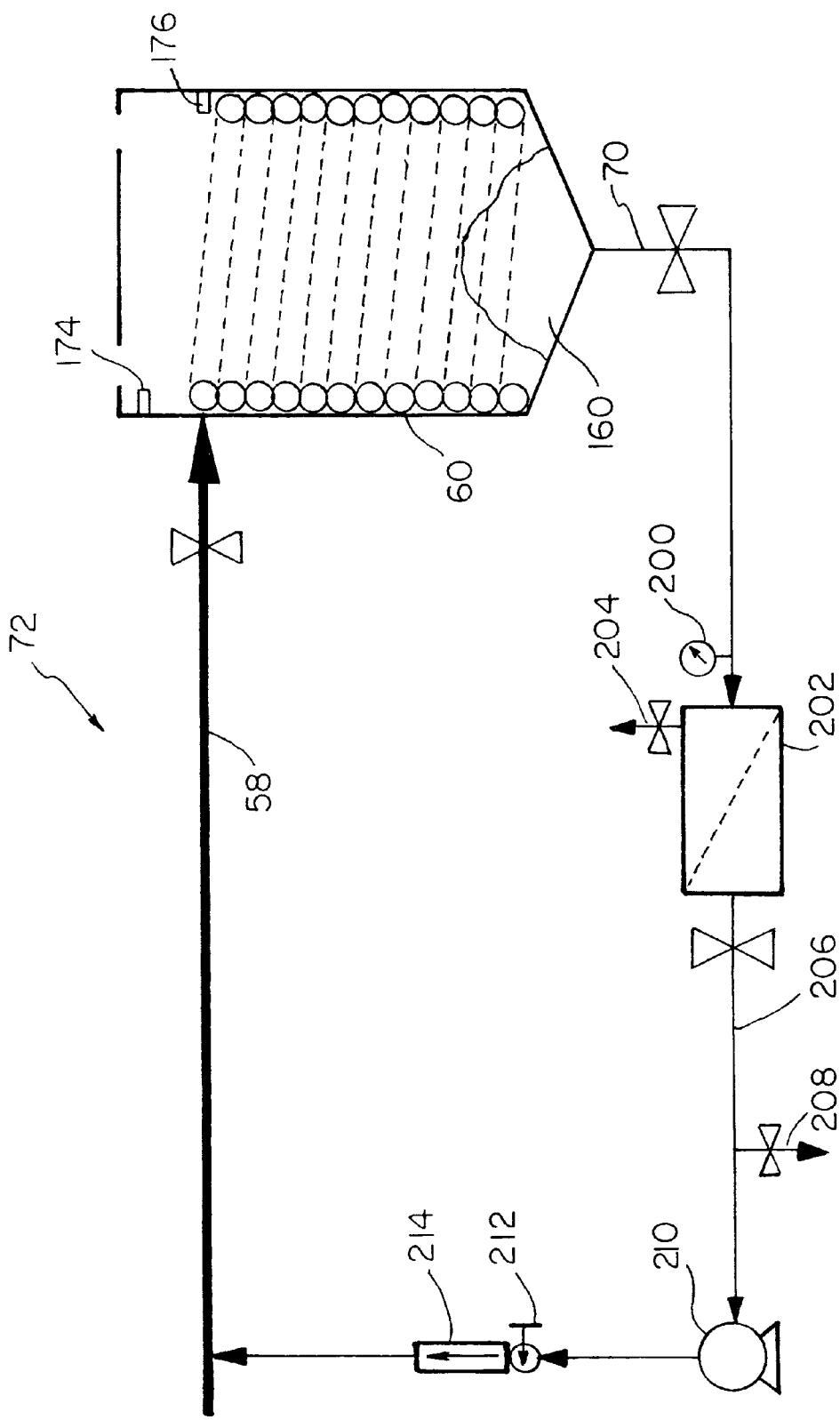
FIG. 6 shows a schematic diagram of a portion of the system in accordance with the present invention illustrated in FIG. 2 pertaining to the sludge or flocculated precipitate removal unit.

Referring now to FIG. 6, sludge removal unit 72 includes line 70 connected to the bottom of tank 60, for removing a solution from tank 60 which contains sludge 160 comprising the precipitate from the reaction of the metal ions and the precipitating agent. This sludge-containing solution flows through line 70 to sludge collecting filter 202, and the load level of filter 202 may, if desired, be monitored using pressure gauge, or switch 200. The sludge collecting filter 202 may, if desired, also be equipped with line 204 for venting purposes and/or sampling the solution at this location of the system. Filtrate from filter 202 flows through line 206 under the action of pump 210 and through flowmeter 214 under the control of flow-rate control valve 212. Filtrate from filter 202 may be sampled through line 208, if desired. The filtrate from filter 202 is combined with the feeding solution in line 154 and the filtrate in line 68. The level of the filtration flux through filter 202 must be carefully controlled to maintain gentle filtration conditions to avoid significant sludge run-through. On the other hand, the total sludge removing flow-rate in this loop must also be maintained high enough, such that the total solid content level in the buffering and sedimentation tank is kept at a constant or decreasing level during the discharging of substantially metal-free solution in the discharge loop 64. In this way, a sustainable continuous process can be established.

In a preferred embodiment of the invention, the solution treated in accordance with the present invention is waste water from the processing of photographic emulsions which contains metal ions, particularly silver ions, which are removed by the method and apparatus in accordance with the present invention. However, one skilled in the art will understand that the method and apparatus in accordance with the present invention may be used to remove metals other than silver from solutions other than photographic processing waste water. For example, the present invention may be used to remove copper (II), zinc, nickel, cadmium and/or mercury from waste water discharged from, for example, plating plants, battery manufacturers, incineration plants, laboratories, hospitals, industrial waste disposal processing plants and electronic part plants. Additionally, the present invention may be used to remove metal ions other than silver (such as iron) from the waste water of photographic emulsion processing. Of course, the removal of other metal ions from other solutions will be apparent to one skilled in the art.

Additionally, the precipitating agent may be any suitable water soluble, polyelectrolyte compound capable of capturing the metal ions and self-agglomerating, i.e., precipitating and agglomerating the metal ions without the need for a separate agglomerating agent. Preferably, the precipitating agent is a polymer containing sulfur atoms which coordinate with the metal ions in solution, the polymers each containing one or more coordination groups, e.g., a thiolate group (—SM), a thiocarbamate group (—NH—CO—SM), or a dithiocarbamate group (—NH—CS$_2$M), the polymers preferably including one of the following structures:

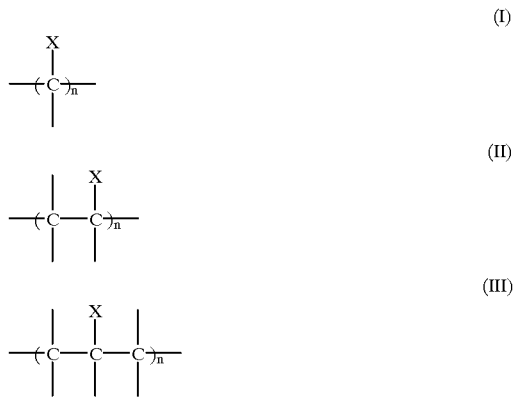

wherein X is either —SM, —NHCOSM or —NHCS$_2$M in which M represents either lithium, sodium, potassium or hydrogen and n is about 100 to about 30,000, more preferably, about 300 to about 10,000. Polymer containing a dithiocarbamate group are preferred. These types of polymers are disclosed in the above-mentioned published Japanese patent applications which were incorporated by reference herein as well as U.S. Pat. Nos. 4,670,160, 4,670,180, 4,731,187 and 5,395,896, the disclosures of which are each herein incorporated by reference.

An especially preferred polymer for use as the precipitating agent in accordance with the present invention is the commercially available polymer SRP-1 distributed by Fuji Hunt Photographic Chemicals, Inc. of Paramus, N.J. which is a mixture of polymers having the following structural formula:

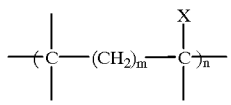

wherein n is 300 to 10,000, and m=0 to 3. Of course, other suitable precipitating agents will be apparent to one skilled in the art.

In the preferred embodiment of the invention wherein metal complex ion, particularly silver ions are removed from the waste water of photographic emulsion processing. It has been discovered that the above-described influent solution and precipitating agent mixing unit 55 is particularly advantageous in that it eliminates the need for a flocculating agent. This is because, referring again to FIG. 4, silver ions present in the solution contained in line 110 react with the preferred precipitating agent discussed above to form a chelated silver-precipitant complex. This chelated silver-precipitant complex is allowed to form in tubing coil 124 and then the chelated silver-precipitant complex is mixed in mixer 128 with additional solution containing silver ions to induce rapid precipitation, i.e., self-agglomeration, in tubing coil 132 which is continued in tubing coil 134, if desired.

While not wishing to be bound by the following theory, it is believed that the preferred linear anionic polymer utilized in the present invention, when exposed to metal ions, forms a complex with the metal ions whereby its charge is partially neutralized, causing the initially outstretched long chain molecule to "fold" or inter-chain cross-link via the metal ion "bridge" and simultaneously force remaining unreacted anionic sites (i.e., sites at which there is no captured metal ion) to be directed outward, toward the water solvent so as to form semi-soluble or colloidal particles. This process may take from 10 seconds to several minutes, depending on the concentration of the metal complex ion, the concentration of the precipitating agent, the solution temperature, pH, ionic strength and other parameters, as would be apparent, and understood by one skilled in the art.

The precipitating agent is preferably added to the influent solution in a total dosage ratio of about 1.0 to 10 equivalents of precipitating agent per equivalent of total metal ions contained in the influent solution, more preferably, 1.2 to 5 equivalents of precipitating agent to total metal ions.

After the initial chelated metal-precipitant complex formation, the second dose of silver ions is added to react with the chelated metal-precipitant complex in mixer 128 and occupies the remaining unreacted anionic sites, simultaneously causing additional charge neutralization and significant reduction of the water solubility of the precipitating agent and metal ion chelated complex, causing rapid precipitation. It will be appreciated that the foregoing operation is particularly advantageous since it avoids the need, expense and complexity of adding a separate agglomerating/flocculating agent, and/or the need to adjust pH to precipitate the chelated complex of silver ions and the precipitating agent.

Another particularly advantageous feature of the invention is the combinations of the parallel precipitate removal unit 72 and separation unit 64 which advantageously avoids the problems associated with sequential processing. In particular, the incidence of sludge run-through has been substantially eliminated by the use of precipitate removal unit 72. Because the precipitate removal unit 72 is separated from the separation unit 64, the conditions in precipitate removal unit 72 may be adjusted to be relatively "gentle" i.e., typically at a flux below 0.5 gal./min.·ft², without deleteriously impacting upon the throughput of the remainder of the system. The gentle filtration conditions also prevent the fragile precipitate from breaking down, and being forced through the filter 202.

Figure 9:
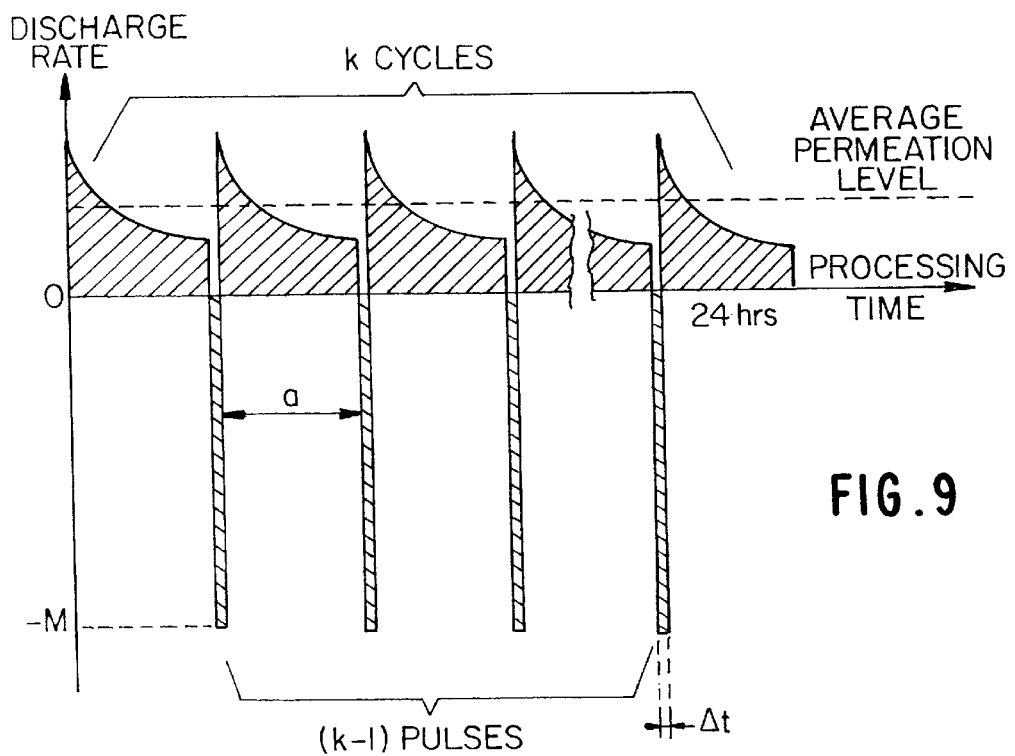
FIG. 9 shows a mathematical model of the permeation level as a function of time during the reverse flushing carried out in Example 3.

Another particularly advantageous feature of the invention is the ability to maximize the daily throughput of treated solution by restoring the maximum permeation rate of filter 180 when necessary. In fact, the permeation rate of filter 180 will gradually decay as filter 180 becomes fouled with a film of precipitate material not in hydrodynamic equilibrium with the influent solution. Of course, fouling films may be removed by chemical and mechanical methods, but such traditional removal methods normally involve complicated procedures and time consuming steps. Oftentimes the normal process must be interrupted. For instance, the desired filter reconditioning or cleaning may be accomplished by circulating 1% (w/w) acetic acid aqueous solution through the filter cassette for 30 minutes, followed by circulating 1% (w/w) sodium hydroxide aqueous solution for an additional 30 minutes. However, filter reverse-flushing mechanism in the system design provides a simple alternative for maximizing the average permeation rate, and thus the daily processing throughput of the system, by periodical flushing of the filter with pulses of fresh water or compressed air, rather than the frequent chemical reconditioning mentioned above. Testing data demonstrated that reverse flushing with short pulses of water can restore the filter permeation rate to nearly 100% (see Example III below). Referring to FIG. 9, the fluctuation of the permeation rate under periodical reflushing can be sketched as shown in the figure. The average permeation level over many decay-flushing cycles is represented by the dashed line. Obviously this level is much higher than the steady-state permeation level following natural decay. The shaded area between the permeation decay curve and the time axis represents the total discharge quantity. The negative area means water being added to the system during flushing. Thus, the net daily throughput is the sum of the total shaded area on the positive side and that on the negative side. To achieve maximum daily throughput, it is desired to optimize the flushing frequency so that the sum of the areas is maximized. Assuming that the flushing pulse has magnitude M, and duration $\Delta t$, if the permeation decay period is a in each repeated cycle, and k is the number of cycles in a 24 hour period, then:

$$k(a+\Delta t) \approx 24 \qquad (1)$$

Curve fittings on typical permeation-rate curves yielded logarithm decay; i.e., the permeation rate (L/hr.) follows:

$$R_p(t) = b - c \log t \qquad (2)$$

Where, b and c are curve fitting constants.

The volume discharged in each decay cycle is (the shaded part in each cycle):

$$V(L) = \int_0^a (b - c\log f) dt \qquad (3)$$

Thus, the total throughput over a 24 hour period is:

$$Q \approx kV(L) - (k-1)M\Delta t \qquad (4)$$

This equation can be numerically calculated and the results can be plotted as a function of the flushing interval a. From this plot, one can obtain the optimum flushing frequency and the maximum daily throughput.

In an actual process, the reverse flushing can be automatically executed by a computer or manually performed, in either case the reverse flushing may be triggered by the occurrence of a fixed time interval or by the permeation rate falling below a threshold level.

In accordance with the preferred embodiment of the present invention directed to removing silver ions from the waste water of photographic emulsion processing, waste water streams containing 1 to 1000 ppm, or a higher concentration, of silver ions may be treated to consistently achieve a discharge level below 0.1 ppm. However, as mentioned above, it will be understood that any suitable metal ion may be removed from any suitable solution by using the method and apparatus in accordance with the present invention, as would be apparent to one skilled in the art.

Parallel processing, in accordance with the present invention, surpasses conventional, sequential processing in efficiency, particularly, for soft and fragile polymeric precipitates. This increase in efficiency is due to the inherent characteristics of the polymeric precipitate preferably utilized in the present invention, e.g. its softness, and its relatively low density differential with respect to the effluent, especially when 1) surfactants are present in the effluent, and 2) when the polymer is not fully saturated with metal ions. The sludge removal process of the present invention is readily operated in a manner that can fully utilize the capacity of the polymer precipitant for removal, and increase the overall throughput rate of the processing system.

The invention is further illustrated by the following examples which are set forth by way of illustration only and not by way of limitation. In the following, the single direct addition of precipitating agent to the solution containing metal ions is referred to as "single stage mixing," while splitting the influent solution stream into two streams, one of which has had added thereto, the precipitating agent, is referred to as "two stage mixing."

EXAMPLE 1

Single Stage Mixing Only

Incoming effluent: [Ag]=216 ppm
UF filter membrane: Pall Filtron Omega-type modified polyethersulfone (PES) Membrane pore size: 100,000 MW cut-off
UF cassette: Open-channel type industrial Maximate Pilot (IMP) cassette; Effective membrane area: 4 ft$^2$; channel separation: 40 mil.
Processing Conditions: Recirculation flow-rate: 3 GPM. Transmembrane pressure: 50 psi. Axial pressure drop: 44–56 psi. SRP-1 dosage: 4.4:1; i.e., 6.7 g SRP-1 per gram of Ag (using 1:100 diluted solution, and fed at 118 ml/L of influent) Sludge removing flux: 0.3 to 1.0 GPM/ft$^2$ The influent was mixed in-line with SRP-1 in a static mixer, and the mixture was introduced into the lower portion of the buffering/sedimentation tank, to ensure sufficient migration/sedimentation time in the tank. The influent feeding rate was adjusted manually. For precise SRP-1 dosage control, two flowmeters were inserted into the effluent feeding line and the SRP-1 dosing line. The dosing flow-rate was adjusted frequently to keep the ratio of the SRP-1 dosing flow and the influent feeding flow at a constant.

Figure 7:
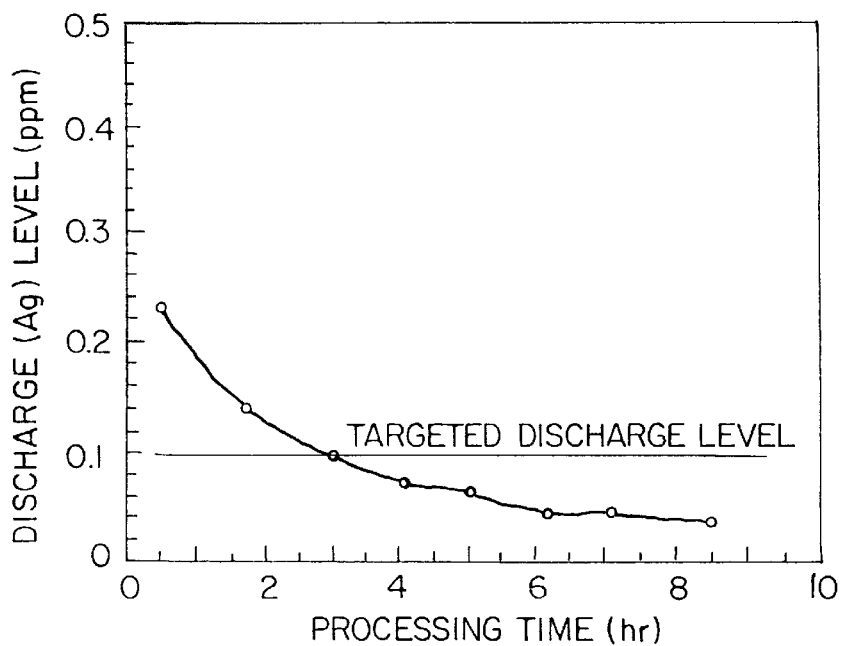
FIGS. 7 and 8 are graphs showing the discharge silver levels at various times for the processes carried out in Examples I and II, respectively.

The testing results are summarized in Table I, and plotted in FIG. 7. The discharge [Ag] level was reduced to about 0.1% of the incoming level even in the first sample collected (30 min. after processing). The 0.1 ppm discharge target was achieved after three hours of processing. The lowest achieved discharge level was below the detection limit of the atomic absorption spectroscopic analytical method used for the experiment.

The efficiency of the sludge removing loop was also visually inspected. The sludge removing flow-rate was varied from 0.3 GPM to 1 GPM (the bag filtration surface area was about 1 ft$^2$). When the flow-rate was optimally below 0.5 GPM, many large pieces of precipitation (visible in the sludge outlet line) were collected by the 5μ bag filter; above 0.5 GPM, sludge run-through was observed.

TABLE I

| | Processing Time (hr.) | (Discharge [Ag] (mg/l) |
|---|---|---|
| 1 | 0.5 | 0.23 |
| 2 | 1.7 | 0.14 |
| 3 | 3.0 | 0.096 |
| 4 | 4.1 | 0.071 |
| 5 | 5.0 | 0.062 |
| 6 | 6.2 | 0.042 |
| 7 | 7.1 | 0.043 |
| 8 | 8.5 | <0.04 |

EXAMPLE 2

Two Stage Mixing

Incoming effluent: [Ag]=114–242 ppm
UF filter membrane: Pall Filtron Hydro-type modified polyethersulfone (PES); pore-size: 30,000 to 50,000 molecular weight cut-off.
UF cassette: Open-channel Industrial Maximate Pilot (IMP) cassette; Effective membrane area: 4 ft$^2$; channel separation: 25 mil. 2 to 4 stacked cassettes
Processing Conditions: Recirculation flow-rate: 5–8 GPM. Transmembrane pressure: 24–47 psi. Axial pressure drop: 9–37 psi. SRP-1 dosage varied between 1.7–8:1. Influent feeding split ratio 1:1 (volumetric). Maximum sludge removing flux: 0.5 GPM/ft$^2$
Timing coils: First Coil—24 ft., ½" i.d. polyester braid reinforced clear PVC tubing. Second coil—60 ft., ½" i.d. polyester braid reinforced clear PVC tubing. Third coil— 100 ft., ¾" i.d. polyester braid reinforced clear PVC tubing.

Figure 8:
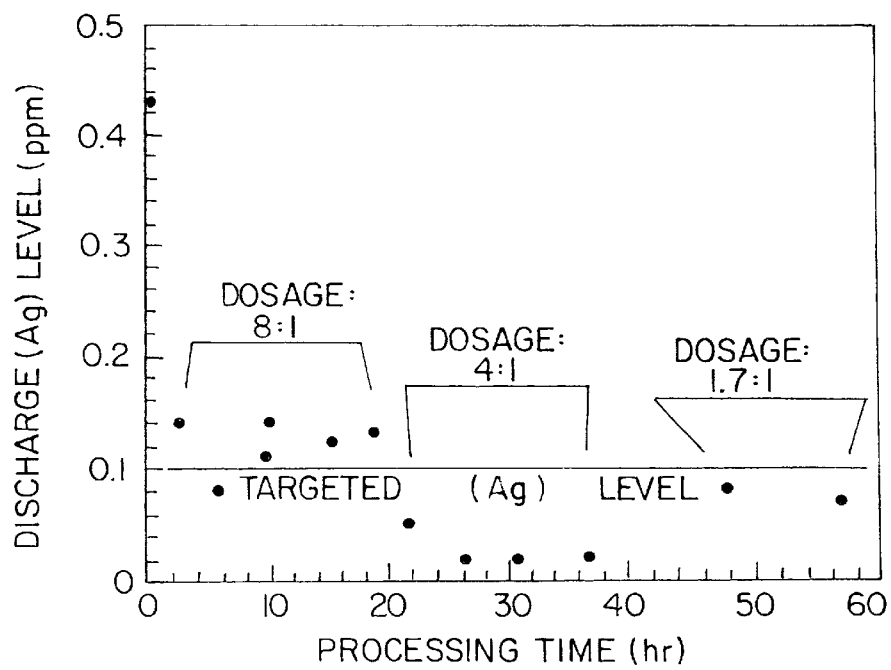

The testing lasted for about 60 hours nearly continuously, except a few short interruptions for filter cleaning. The SRP-1 dosage was varied every 20 hours, from equivalent ratio of 8:1 to 1.7:1 (equivalents SRP-1: equivalents Ag). The dosing control was similar to Example I. The result is presented in Table II, and plotted in FIG. 8. (The initial sample containing an elevated silver level was collected 10 minutes after the installation of a new filter.)

TABLE II

| | Processing Time (hr.) | Discharge [Ag] (mg/l) |
|---|---|---|
| 0 | 0.5 | 0.43 |
| 1 | 2.9 | 0.14 |
| 2 | 6 | 0.08 |
| 3 | 9.937 | 0.11 |
| 4 | 10.22 | 0.14 |
| 5 | 15.63 | 0.12 |
| 6 | 19.22 | 0.13 |
| 7 | 21.89 | 0.05 |

TABLE II-continued

| | Processing Time (hr.) | Discharge [Ag] (mg/l) |
|---|---|---|
| 8 | 26.39 | <0.04 |
| 9 | 30.89 | <0.04 |
| 10 | 36.72 | <0.04 |
| 11 | 48.05 | 0.08 |
| 12 | 56.89 | 0.07 |

EXAMPLE 3

Maximizing System Daily Throughput by Use of Reverse Flushing

The UF filter used was a single IMP 40 mil cassette, 30,000 MW cut-off, hydro PES Membrane Type. The apparatus was the same as in Example 2 except that the third timing coil was deleted. SRP-1 dosage was 3:1 (equivalents of SRP-1 to equivalents of Ag). Influent concentration of Ag was 310 mg/l. Recirculation flow was 4 GPM. Measured UF filter transmembrane pressure varied between 21 to 33 psi.

TABLE III

| Observation Time (hr.) | Permeation Rate (ml/min.) | Discharge [Ag] Level (ppm) |
|---|---|---|
| 0.17 | 1186 | |
| 1 | 940 | |
| 1.33 | 680 | below detection limit |
| 1.83 | 490 | below detection limit |
| 1.85 | −15000 (reverse flushing 10 sec.) | |
| 1.95 | 1000 | |
| 2.03 | | below detection limit |
| 2.33 | 550 | |
| 2.36 | −15000 (reverse flushing 10 sec.) | |
| 2.42 | 1100 | |
| 2.45 | | below detection limit |
| 3.06 | 420 | |

Permeation rate across the UF membrane and discharge Ag level was monitored as a function of time and is listed in Table III.

EXAMPLE 4

Study of Ag Concentration in the Buffering Tank as a Function of Processing

The UF filter was the same as described in Example 3. The apparatus was the same as in Example 3. SRP-1 dosage was 3:1 (equivalents of SRP-1 to equivalents of Ag). Influent concentration of Ag was 310 mg/l. Recirculation flow was 2 GPM. Measured UF filter transmembrane pressure varied between 20 to 21 psi.

Ag analysis of the upper layer of the solution in the buffering tank was done periodically to examine whether the inventive system could be operated without incurring a buildup of the solid content of the tank, which would necessitate disadvantageous batch type operation rather than the more economically advantageous continuous operation.

Figure 10:
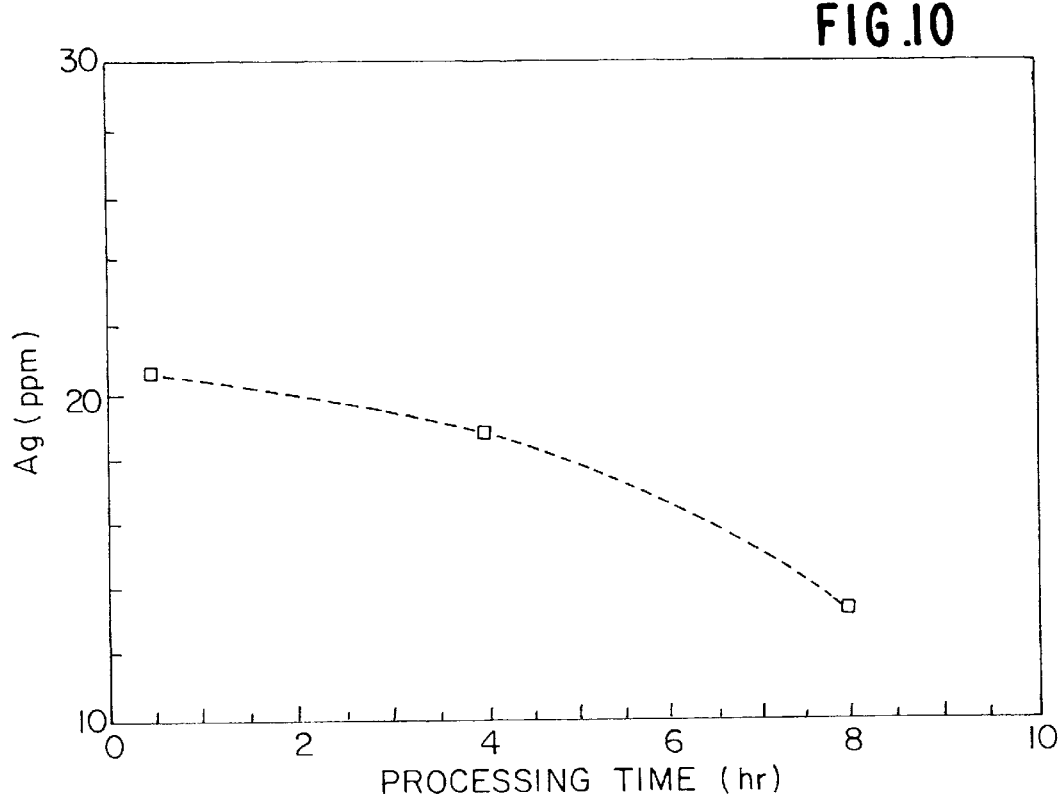
FIG. 10 shows the silver ion concentration variation over time at the second outlet of the buffering tank depicted in FIG. 5 for the process carried out in Example 4.

Table IV and FIG. 10 illustrate the declining level of Ag in the buffering tank within an 8 hour period under the above-described operating conditions. The gradual decline of the silver level indicates that the silver containing precipitate had been effectively removed from the system, and that the removal rate was outpacing the rate of fresh complex being continuously fed into the system.

TABLE IV

| Time (hrs.) | [AgI], mg/l |
|---|---|
| 1 | 20.6 |
| 4 | 18.9 |
| 8 | 13.6 |

Although the present invention has been described in connection with a preferred embodiment thereof, many other variations and modifications and other uses will become apparent to those skilled in the art without departing from the scope of the invention. It is preferred, therefore, that the present invention not be limited by the specific disclosure herein, but only by the appended claims.

What is claimed is:

1. A method for precipitating metal ions from a solution, comprising the steps of:

(a) dividing an influent stream of the solution into a first solution stream and a second solution stream;

(b) mixing the first solution stream with an amount of a precipitating agent effective to form a chelated metal-precipitant complex, the chelated metal-precipitant complex containing the metal ions and the precipitating agent, wherein the metal ions are silver ions and the precipitating agent comprises a water soluble, polyelectrolyte compound; and (c) mixing subsequently the chelated metal-precipitant complex with the second solution stream, the second solution stream containing an amount of the metal ions effective to rapidly precipitate the complex of the metal ions and the precipitating agent.

2. The method of claim 1, further comprising the steps of contacting the precipitating agent and the first solution stream for a first predetermined time interval after the step of mixing the first solution stream with the precipitating agent and subsequently contacting the resulting stream with metal ions for a second predetermined time interval.

3. The method of claim 2, wherein the first contacting step comprises contacting the precipitating agent and the first solution stream for an interval of about 10 seconds to about 5 minutes, and wherein the second contacting step comprises contacting the resulting stream with metal ions for an interval of about 1 to about 5 minutes.

4. The method of claim 1, wherein in both steps (b) and (c) a total of 1.0 to 10 equivalents of the precipitating agent is added to the solution per equivalent of metal ions contained in the solution.

5. The method of claim 4, wherein in both steps (b) and (c) a total of 1.2 to 5 equivalents of precipitating agent is added to the solution per equivalent of metal ions contained in the solution.

6. The method of claim 1, wherein step (b) comprises mixing the first solution stream with a precipitating agent comprising a water soluble, polyelectrolyte compound comprising a coordination group selected from the groups consisting of a thiol group, a thiocarbamic acid group, a dithiocarbamic acid group, or derivatives thereof.

7. The method of claim 6, wherein step (b) comprises mixing the solution with a precipitating agent having one of the following structures:

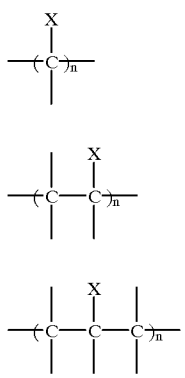

wherein:

X is either —SM, —NHCOSM or —NHCS$_2$M in which M represents either lithium, sodium, potassium or hydrogen; and n is from about 100 to about 30,000.

8. The method of claim 1, wherein the solution comprises waste water from photographic emulsion processing, the waste water containing the silver ions to be removed.

9. A method for removing metal complex ions from a solution containing the metal complex ions to be removed, comprising the steps of:

(a) dividing an influent stream of the solution into a first solution stream and a second solution stream;

(b) mixing the first solution stream with an amount of a precipitating agent effective to form a chelated metal-precipitant complex, the chelated metal-precipitant complex containing a complex of the metal complex ions and the precipitating agent, wherein the metal complex ions are silver complex ions and the precipitating agent comprises a water soluble, polyelectrolyte compound;

(c) mixing subsequently the chelated metal-precipitant complex with the second solution stream, the second solution stream containing an amount of metal complex ions effective to rapidly precipitate the complex of the metal complex ions and the precipitating agent and thereby forming a precipitate;

(d) removing the precipitate from the solution of step (c) by:

(i) coarse filtering of the precipitate to produce a filtered solution containing unfiltered remaining precipitate;

(ii) settling the unfiltered, remaining precipitate from the filtered solution in a tank;

(iii) withdrawing a third solution stream from the tank, the third solution stream containing the settled remaining precipitate;

(iv) removing the precipitate from the third solution stream; and (v) adding the thus treated solution stream to the solution in the tank; and (e) discharging substantially metal-free effluent by withdrawing a fourth solution stream from the tank, the fourth solution stream containing an unsettled precipitate, concentrating the unsettled precipitate from the fourth solution stream to produce metal-free effluent and adding the unsettled precipitate to the solution in the tank.

10. The method of claim 9, wherein the solution stream comprises waste water from photographic emulsion processing, the waste water containing the silver ions to be removed.

11. The method of claim 9, wherein step (d)(i) comprises forming a precipitate coated layer for efficiently trapping unchelated metal ions.

12. The method of claim 9, wherein step (d)(ii) comprises subjecting the solution containing unfiltered remaining precipitate to a vortex to segregate the remaining precipitate.

13. The method of claim 9, wherein step (d)(iv) comprises filtering the third solution stream through a dead-end filter.

* * * * *